United States Patent
Bouvet et al.

[11] Patent Number: 5,189,428
[45] Date of Patent: Feb. 23, 1993

[54] METHOD FOR THE PROCESSING OF A DIGITALLY ENCODED PULSE SIGNAL

[75] Inventors: Jacky Bouvet, Boulogne; Anne Chapelet, La Celle St. Cloud, both of France

[73] Assignee: Thomson-CSF, Puteaux, France

[21] Appl. No.: 810,687

[22] Filed: Dec. 19, 1991

[30] Foreign Application Priority Data

Dec. 27, 1990 [FR] France .................... 90 16325

[51] Int. Cl.$^5$ .................... G01S 7/285; G01S 13/28
[52] U.S. Cl. .................... 342/132; 342/145; 342/189; 342/378
[58] Field of Search .................... 342/132, 145, 189, 378

[56] References Cited

U.S. PATENT DOCUMENTS

| | | | |
|---|---|---|---|
| 4,153,900 | 5/1979 | Novak et al. | 342/132 |
| 4,259,650 | 3/1981 | Donahue | 342/379 X |
| 4,910,719 | 3/1990 | Thubert | 342/145 |
| 5,047,780 | 9/1991 | Dijkstra | 342/145 |

FOREIGN PATENT DOCUMENTS

| | | |
|---|---|---|
| 0336272 | 10/1989 | European Pat. Off. . |
| 2332541 | 6/1977 | France . |

OTHER PUBLICATIONS

Colloque Int'l Sur Le Radar, Paris, Dec. 4-8, 1978 pp. 60-67.
IEEE 1990 Int'l Radar Conference, Arlington, Va. May 7-10, 1990 pp. 249-252.

*Primary Examiner*—T. H. Tubbesing
*Attorney, Agent, or Firm*—Marmorek, Guttman & Rubenstein

[57] ABSTRACT

Disclosed is a method for the processing of a signal received directly or indirectly from a transmitter, sending out pulses that are digitally encoded according to a transmission code of N instants; said processing comprising notably an operation of filtering that is matched with the transmitted signal and an operation of detection by the comparison of the post-filtering level of the signal with a so-called detection threshold; wherein the signal received is subjected to two processing operations A and B, the processing operation A comprising a self-correlation and the processing operation B comprising an intercorrelation with a mismatched code having a length at least equal to 3N, the function of intercorrelation of this mismatched code with the transmission code giving a major central lobe and at least N side lobes that are zero on either side of this major lobe; and wherein it is decided that there is a detection relating to one of the instants of the correlation or of the intercorrelation only if the levels of the functions of self-correlation and intercorrelation of this very same instant are higher than the detection threshold.

7 Claims, 3 Drawing Sheets

METHOD FOR THE PROCESSING OF A DIGITALLY ENCODED PULSE SIGNAL

BACKGROUND OF THE INVENTION

1. Field of the Invention

The invention relates to the field of radars with digital pulse compression and, more particularly, to the field of short-range radars.

However, its scope can be broadened, and it can be used in the field of analog pulse compression radars and telecommunications receivers receiving signals that have a low level in relation to the noise.

2. Description of the Prior Art

It is known that short-range radars send out a series of pulses with a duration $N\tau$. In this expression, N designates an integer and $\tau$ designates an elementary instant of the pulse. Each of the elementary instants of the pulse is modulated by a variation of a parameter of the transmission. This parameter may be, for example, the phase or the frequency. Thus, for duration $N\tau$ may or may not be assigned a phase shift $\pi$. By convention, the phase 0 (coefficient 1) shall be taken for the binary code 1 and the phase $\pi$ (coefficient $-1$) shall be taken for the binary number 0.

The signals received, which include noise and the return echo from a target if any, are compared with the transmitted wave by being passed through a correlator.

The correlation of two functions gives the measure of the resemblance existing between them: it is essentially a method of comparison.

In digital terms, the signals are represented by sequences of numbers which are successive samples of a continuous waveform.

The function of correlation of f(k) and g(k), the two digital sequences obtained by the sampling of two continuous functions f(t) and g(t), is expressed mathematically by the relationship:

$$S(k) = \int_{i=-\infty}^{+\infty} f(i) \cdot g(i + k)$$

with i = index of the sample
and k = index of the shift

When f and g are different functions, the term used is "intercorrelation".

When f and g are identical functions, the term used is "self-correlation".

The function of self-correlation S(k) of a code of N instants represented by the sequence $C_i$ (i ranging from 0 to $N-1$) is the measure of the resemblance existing between the code and itself, shifted by a number k of instants.

$$S(k) = \sum_{i=0}^{N-1} C_i \cdot C_{(i+k)}$$

The result of the self-correlation of a code with a duration of N instants is a sequence of numbers that represents the amplitude of the signal as a function of the successive shifts that are applied to it, it being possible for these shifts to be graduated in time or in distance since, in radar, $$D = C \cdot t/2 (10 \text{ m} <<=>> 66.66 \text{ ns}).$$

The self-correlation function is symmetrical:

$$S(k) = S(-k)$$

It gives a main peak and side lobes.

| Thus, between the code with five instants | 11101 |
| and this same code shifted by 0 | 11101 |

There are five resemblances whence S(0) = 5.

| To compute S(1) | 11101 |
| Code shifted by 1 | 11101 |

There are two resemblances and two differences, whence S(1) = 0.

| To compute S(2) | 11101 |
| Code shifted by 2 | 11101 |

There are two resemblances and one difference, whence S(2) = 1.

In the same way, we find S(3) = 0, S(4) = 1.

The number of resemblances of a code with N instants in relation to itself shifted in time is the maximum for a zero shift and is equal to N.

S(0) = N

S(0) is the main peak, with a width equal to a shift. It gives the distance of the target.

For the other shifts, with k ranging from 1 to N−1, the self-correlation gives a smaller result, which may be zero. This result depends solely on the code chosen. These results are the side lobes: they are on either side of the main peak and are symmetrical, S(k) being equal to S(−k).

If a side lobe of a code with N instants has the value m, its attenuation in decibels in relation to the major lobe is equal to:

lobe i = 20 log m/N.

If we again take up the example of the code with five instants 11101, the representation in time of its self-correlation function is shown in FIG. 1, for k varying from −5 to +5.

This function reveals a major lobe for k = 0 and 4 side lobes with a value 1.

The relative level of the side lobes is: 20 log(1/5) = 14 dB.

An example with a two-phased code has just been seen.

Two-phased codes are only a particular case of polyphased codes where the coefficients are complex numbers (n-th roots of unity).

two-phased codes: 1 −1 quadriphased codes: 1 j −1 −j

There is another way of defining the correlation, in using the plane of the complex numbers.

The phase code with a length of N instants used at transmission may be represented in the complex plane in the form of an N−1 degree polynomial C(z), conventionally defined on the variable z this variable represents a temporal shift of one where the rank of the sample and the phases of the code define the coefficients (+1 or −1 in the case of a two-phase code).

The two-phase code with five instants 11101 may be depicted in the form of a 4th degree polynomial:

$$C(z) = 1 + z^{-1} + z^{-2} - z^{-3} + z^{-4}$$

The reference code CR(z) adapted to the code C(z) corresponds to the conjugate complex code of C(z), temporally inverted. Indeed, when a code C(z) is self-correlated by its replica CR(z) in a digital correlator, this replica should be the conjugate of the initial code inverted in time:
for $$C(z) = 1 + z^{-1} + z^{-2} - z^{-3} + z^{-4}$$

The code 11101 should first of all receive 1 (stage 1 of the digital correlator), then −1 (stage 2) and finally 3 times 1 (stages 3, 4, 5):
whence:

$$CR(z) = 1 - z^{-1} + z^{-2} + z^{-3} + z^{-4}$$

This operation, which can be explained physically, is equivalent to the transformation of z into 1:z and to the addition of a delay. In the case of the polyphased codes, it is necessary in addition to take the conjugate coefficient:

$$CR(z) = C^*(1/z) \cdot z^{-(n-1)}$$

that is, a code: 11j−j−1
It can be written thus:

$$C(z) = 1 + z^{-1} + jz^{-2} - jz^{-3} - z^{-4}$$

The matched code is:

$$CR(z) = -1 + jz^{-1} - jz^{-2} + z^{-3} + z^{-4}$$

In the correlator, the coefficients should be arranged thus:

| stage | 1 | 2 | 3 | 4 | 5 |
|---|---|---|---|---|---|
| coefficient | −1 | j | −j | 1 | 1 |

The correlation function S(z) is expressed thus:

$$S(z) = C(z) \cdot CR(z) = C(z) \cdot C^*(1/z) \cdot z^{-(n-1)}$$

In the example of the code 11101:

$$S(z) = C(z) \cdot CR(z) =$$
$$(1 + z^{-1} + z^{-2} - z^{-3} + z^{-4})(1 - z^{-1} + z^{-2} + z^{-3} + z^{-4})$$
$$S(z) = 1 + z^{-2} + 5z^{-4} + z^{-6} + z^{-8}$$

The result obtained in the example where the same code was simply two-phased is found again: 101050101 with a main peak at 5 and the side lobes at 1.

The correlation operations are done for all the distances of the range of the radar, i.e. every $C\tau/2$. This means that the correlation operation should be carried out every $\tau$. The corresponding polynomials are therefore assigned a factor $z^{-m}$ representing the different delays.

Radar designers have been led to use pulse compression to improve the resolution in distance.

Starting from a standard radar sending out pulses with a duration T shown in FIG. 2a, the response obtained at output of a matched filter is shown in FIG. 2b.

In these figures, it is seen that a square-wave signal with a duration T corresponds to a saw-toothed self-correlation function leading to an uncertainty over the distance of the target.

By building a pulse compression radar that sends out pulses with a width of $T = N\tau$, it is sought to achieve the ideal response.

The transmitted signal and the corresponding self-correlation function are shown in FIGS. 3a and 3b.

The transmitted signal comprises a code with five instants 11101 (the code of the example), the self-correlation function being represented by a peak with a width $\tau$. The uncertainty over the distance has been divided by N.

In fact, as shown further above, this ideal response is approached, but for the side lobes.

For each distance, after a processing that depends on the type of radar, the result of the detection is compared with a threshold and all that is above this threshold prompts a detection. It may therefore happen that, under certain conditions (very high echo), the side lobe leads to a detection. This unwanted detection is really prompted by the echo, but at a false distance.

The display of the targets is activated by the detection: the problem of detection therefore relates to the display. The measurements and the computations made in the processing operation lead to the localization of the targets, in terms of both distance and bearing and, in the Doppler radars, they make it possible to ascertain the speed of the detected targets with precision. These information elements can be displayed on a screen, either on a cathode-ray tube or, as is becoming increasingly common, on a digital screen.

The pips, which represent the detected targets, generally represent the width of the transmission pulse in a standard radar and the width of the elementary instant in a pulse compression radar.

Thus, in the case of pulse compression (CI), the side lobes will also prompt pips on the screen, from a certain degree of signal power reflected by the target. This phenomenon will appear as soon as the signal-to-noise ratio of an echo is greater than the rejection of the side lobes.

The side lobes extend over a distance equal to 2N times the width of the elementary instant, the main lobe being located in the middle. Their number will therefore increase concomitantly with an increase in the compression rate.

It has been seen here above that the self-correlation inevitably produces side lobes. Their level depends on the codes employed, whence the importance of the choice of the codes.

For a code with N instants, the major lobe always has the value N.

It has been sought to reduce the value of the side lobes to the minimum. The minimum value that can be obtained is 1. The codes that fulfill the condition of having a maximum number of side lobes equal to 1 are the so-called Barker codes.

The study of these codes has shown that they exist only up to a maximum length of 13 and that, for this value, the level of the side lobes will therefore be: 20 Log 13 = 22 dB.

It may also be sought to increase the value of the main peak. To achieve this, it is enough to increase N.

The pseudo-random sequences, or maximum length sequences, are especially promising because they have a structure similar to that of the random sequences and have valuable self-correlation functions. A looped shift register generates a pseudo-random sequence in a simple and practical way. After the stages of a shift register have been initialized at 1, an addition modulo 2 is made of the outputs, and the result of this addition constitutes the input of the register. The outputs of the shift register constitute generators of sequences of 0 and 1 which are repeated. These sequences have a length that depends on the loops. When the summed up stages are suitably chosen, a sequence is obtained having a maximum length, for an N-stage register, of: $L = 2^N - 1$.

The results of the self-correlation function of these codes give a main peak to side lobe ratio of the order of $\sqrt{N}$.

In practice it is possible, with such codes, to reduce the side lobes to 24 dB below the main peak.

It is also possible to place a code with a length greater than the transmitted reference code in the place of the matched code. This is the mismatched code method.

This method leads to losses that have to be computed in each case. Very satisfactory results can be obtained with losses of the order of 0.2 to 1 dB.

The methods just explained, which are used to reduce the side lobes, all have characteristic qualities and defects:

the Barker codes (with a length N) leave secondary lobes with relatively high levels spread over 2N instants;

the mismatched codes leave the secondary lobes at a low level but spread over far greater distances.

The attenuations obtained are generally sufficient for long-range radars. By contrast, short-range radars generally have very substantial dynamic ranges of signals.

The unwanted detections due to the secondary lobes, which are appreciable especially with short-range radars, have many drawbacks, particularly when it is sought to provide the radar with special functions such as, for example, the acquisition and automatic tracking of moving targets. When a target is determined, its position is determined and the radar remains aimed at it. It follows its movements both in distance and in relative bearing, and remains "locked on" as long as the operator wishes it.

This method can work accurately only if the target is precisely localized. The presence of side lobes may lead to difficulties in tracking a moving target. Similarly, when a protected site has to be monitored by means of a radar, there may be zones (for example roads, etc.) where the presence of moving targets is normal. In this case, the detections should not prompt alarms, and these zones need to be inhibited. The monitoring of perimeters is a particular example of the management of zones: the radar monitors a portion of ground with a determined width (for example the rim of a protected site) and should raise an alarm only for targets moving in this zone. Targets located within inhibited zones may prompt detections in adjacent zones through their side lobes which are located within the active monitoring zone and thus prompt unwanted detections.

SUMMARY OF THE INVENTION

An object of the invention, therefore, is a method designed to attenuate and, if necessary, to eliminate the effect of the side lobes.

To this end, the invention is aimed at providing a method for the processing of a signal received directly or indirectly from a transmitter, sending out pulses that are digitally encoded according to a transmission code of N instants;

said processing comprising notably an operation of filtering that is matched with the transmitted signal and an operation of detection by the comparison of the post-filtering level of the signal with a so-called detection threshold;

wherein the signal received is subjected to two processing operations A and B, the processing operation A comprising a self-correlation and the processing operation B comprising an intercorrelation with a mismatched code having a length at least equal to 3N, the function of intercorrelation of this mismatched code with the transmission code giving a major central lobe and at least N side lobes that are zero on either side of this major lobe;

and wherein it is decided that there is a detection relating to one of the instants of the correlation or of the intercorrelation only if the levels of the functions of self-correlation and intercorrelation of this very same instant are higher than the detection threshold.

The signal is considered to be coming directly from the transmitter in the case of signals transmitted for purposes of communication, even when the signal transits between the transmitter and the receiver in corridors by reflection or refraction on the atmospheric layers.

The signal is considered to be of indirect origin when the transmitter and the receiver are close to each other and when the receiver receives a signal sent out by the transmitter after reflection on a non-cooperating object, which is the case with radar signals. The instants of the self-correlation function and the intercorrelation function are said to be the same, if they are at the same distance from their respective major lobes.

In addition to the detection criterion, at the end of each of the processing operations A and B, it may be decided that there is a detection only after the signals coming from the processing operations A and B have been subjected to an additional criterion. This criterion may be a difference in level between the two signals, smaller than a certain threshold.

The receiver working according to the method of the invention will have, at the signal filtering level, two channels for the processing of the signal received, one comprising a self-correlation and the other comprising an intercorrelation with a mismatched signal having a length at least equal to 3N, the intercorrelation function having at least N zero side lobes on either side of the major lobe. The detection circuit will also have two channels, each comprising a comparator of the signal with the detection threshold, a logic module sending out a signal corresponding to the detection only if, from instant to instant, there is detection in both comparators. If the signal is subjected to an additional criterion, then the processing chain will include the logic module or the circuit capable of carrying out the desired comparison.

The two processing channels at the filtering and detection levels could be physical or temporal. They will be physical if there actually exist two parallel channels. They will be temporal if the two processing operations A and B are carried out successively on one and the same physical channel in multiplexing mode.

BRIEF DESCRIPTION OF THE DRAWINGS

FIG. 3b depicts a corresponding autocorrelation of the signal of FIG. 3a.

Figure 1:
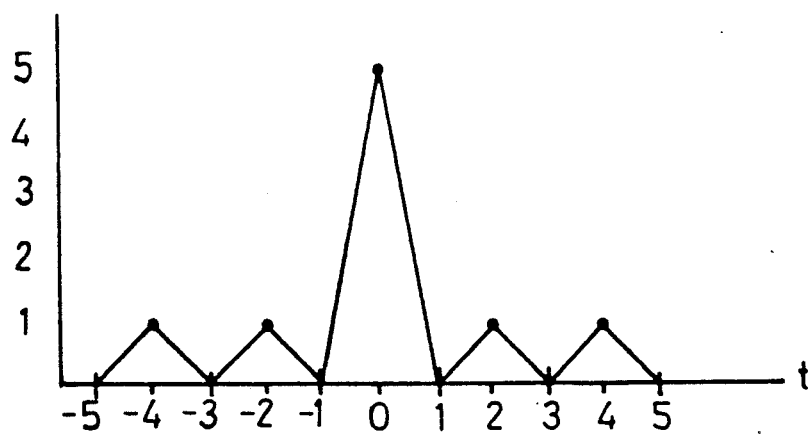
FIG. 1 depicts the graph of an autocorrelation of an exemplary pulse signal.
Figure 2A:
FIG. 2a depicts a transmitted pulse signal.
Figure 2B:
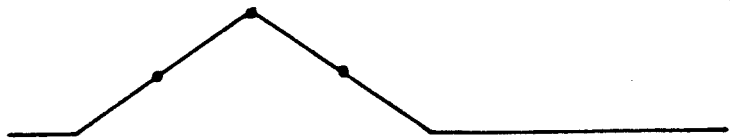
FIG. 2b depicts a response to the signal of FIG. 2a obtained at the output of a matched filter.
Figure 3A:
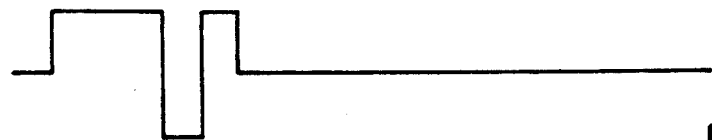
FIG. 3a depicts a transmitted pulse compression signal.
Figure 3B:
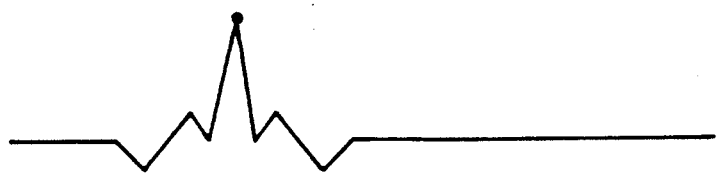
Figure 4A:
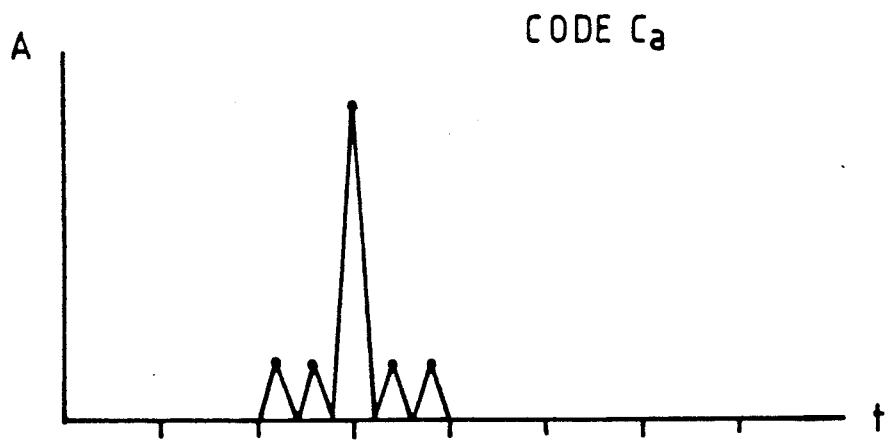
Figure 4B:
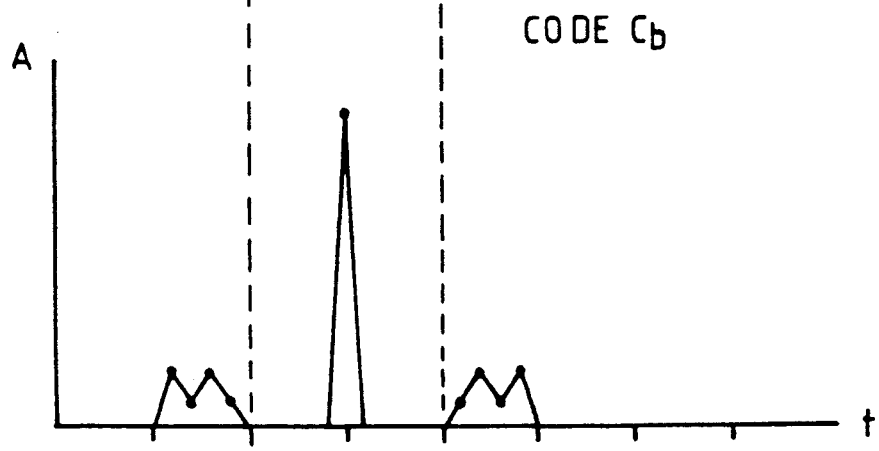
Figure 4C:
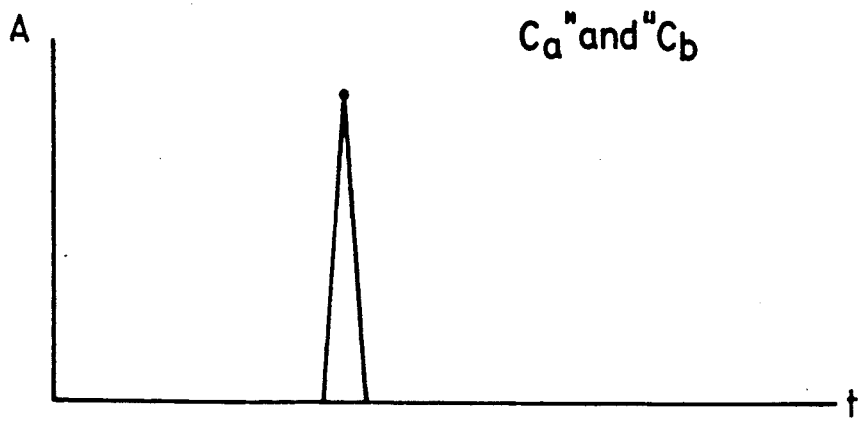

The invention shall now be explained with reference to FIGS. 4a-4c, 5, 6 and 7 in which the FIGS. 4a-4c represent a signal at output of processing A (4a) at output of processing B (4b) and after detection and assembling by a logic AND operation (4c).

Figure 5:
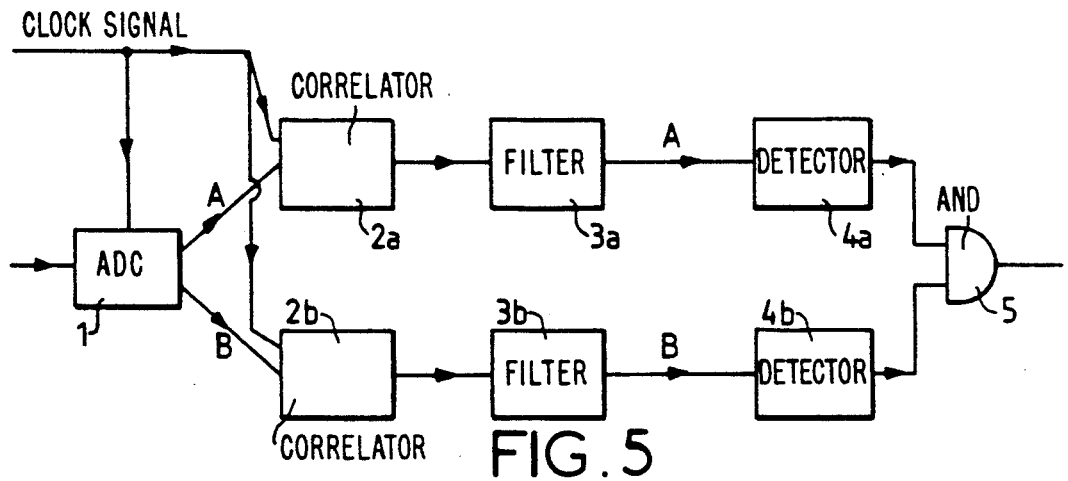

FIG. 5 shows a part of a receiver according to the invention.

Figure 6:
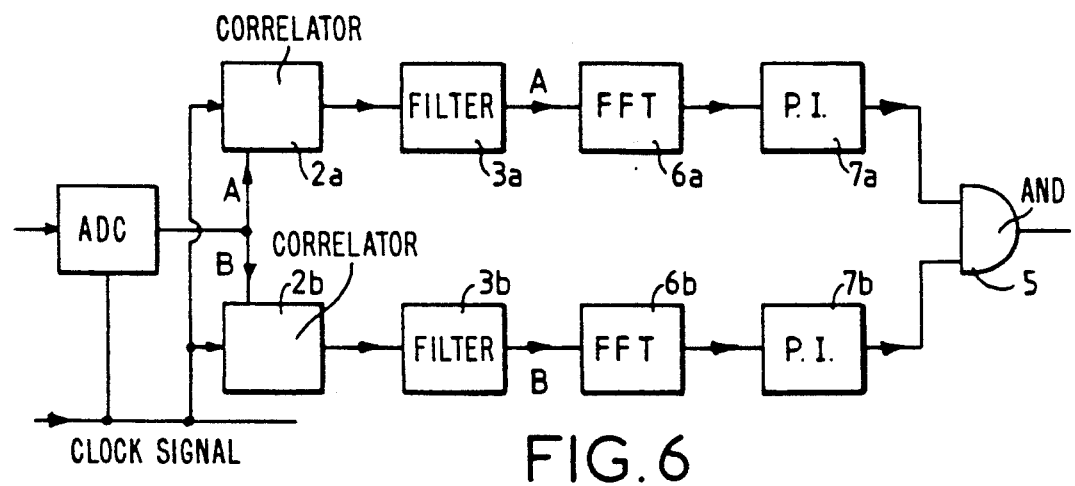

FIG. 6 shows a part of a Doppler radar receiver according to the invention.

Figure 7:
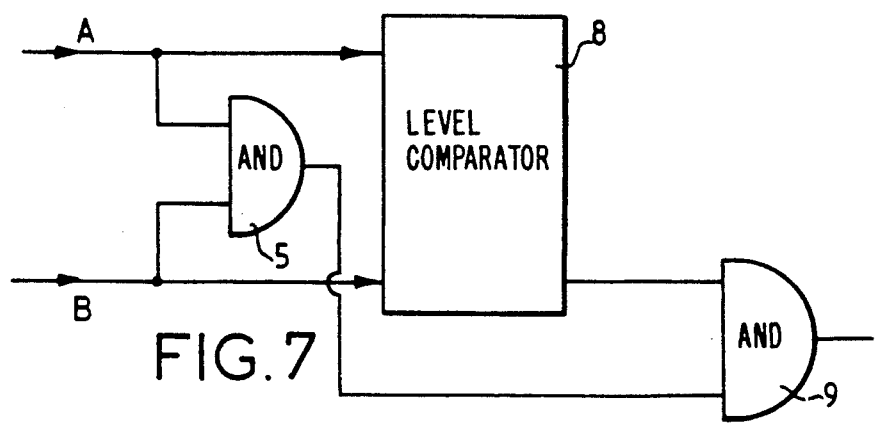

FIG. 7 shows a circuit which may illustratively be connected to the end of the processing channels of the circuits of FIGS. 5 or 6.

MORE DETAILED DESCRIPTION

It has been seen that the standard methods of action on the side lobes by Barker codes or mismatched codes each have their drawbacks.

It is possible, and this is the object of the invention, to devise a method of processing that uses both methods and retains only their promising features. The principle can be expressed in three points:

the transmission of a code at N instants

Reception: two processing channels:

* A standard processing "A":

The N coefficients of the correlator are identical to those of the code sent out. After filtering, a detection information element called PIPA$_j$ is available for each instant j:

PIPA$_j$=0 if there is no detection for instant.

PIPA$_j$=1 if there is detection.

There can be detection only on N instants on either side of the main peak.

a weighted processing "B" using, at reception, a mismatched code with a length at least equal to 3N: the coefficients are computed so as to obtain at least N zeros (zero secondary lobes) on either side of the main peak. As in the case of the processing "A", after filtering, the detection information elements, called PIPB$_j$, are available:

PIPB$_j$=0 if there is no detection.

PIPB$_j$=1 if there is detection.

Detections are possible only on the main peak and in the two zones located N instants before or after this peak.

The resulting pips PIP$_j$ are obtained by carrying out AND logic operations on the detection information elements PIPA$_j$ and PIPB$_j$ which result from the two processing operations A and B.

$$PIP_j = PIPA_j \text{ "AND" } PIPB_j$$

The amplitude of the signals for each of the instants at output of correlation and intercorrelation, and after AND logic operations is shown in FIG. 4a, 4b and 4c respectively.

It is seen that, because of the properties of the codes chosen, there can be detection only on the major lobe.

It is noted that, in the case of a radar, the instants that physically represent successive clock increments correspond to distance windows. On the contrary, in communication, they correspond to time shifts in the operation of listening to the signal to be received.

In the case of a Doppler radar, a Fast Fourier Transform (FFT) in each of the processing channels A and B will enable the determining, for each window with a speed i and a distance j, of the detection information elements PIPA$_{ij}$ and PIPB$_{ij}$ which the logic AND circuit will convert into PIP$_j$ detection information.

The mode of computation of the mismatched code shall now be described in detail.

The pulse transmitted is a pulse formed by N instants, phase modulated at the rate of a binary code. The transmission code is chosen to have the best possible rejection of the side lobes: for a length N smaller than 13, a Barker code is the best choice.

A standard processing operation A, implementing a matched code at reception, is used. The coefficients of the correlator are therefore all identical except for the sign. The results obtained are those that have been described further above, namely a maximum rejection of 22 dB of the side lobes for the Barker code with 13 instants. These side lobes are located at N instants on either side of the main peak.

The minimum length of the mismatched code CD(z) that is used for the processing B and is necessary to have N zero side lobes on either side of the main peak is 3N. This code is obtained in two steps:

computation of the mismatched code;

additional computation on the coefficients to obtain zero on each of the N lobes that surround the main peak.

The aim of the mismatched code CD(z) is to obtain an ideal correlation function with zero side lobes:

$$S(z) = N \cdot z^{-m}$$

It is therefore enough to find the code CD(z) such that:

$$S(z) = C(z) \cdot CD(z) = N \cdot z^{-m}$$

Whence $$CD(z) = N \cdot z^{-m} \cdot 1/C(z)$$

CD(z) corresponds to the reverse filter 1/C(z) delayed by $z^{-m}$ and amplified by the factor N. Furthermore, as with the matched code, it is necessary to invert C(z) in time to have the coefficients in the right arrangement.

If $z_i$ (i=1 to N−1) are the N−1 complex roots of the polynomial C(z), then CD(z), plus or minus the delay $z^{-m}$, may be written in the form:

$$CD(z) = 1/(z^{-1} - a_1) \cdot (z^{-1} - a_2) \ldots (z^{-1} - a_{n-1})$$

The roots of C(z) may be separated into two groups, one $C_1(z)$ for the roots located within the greater than 1.

$$CD(z) = 1/C_1(z) \cdot 1/C_2(z)$$

For $C_1(z)$, it is possible to find an approximation of $1/(z^{-1} - a)$ by rightward polynomial division:

$$1/(z^{-1} - a) = (a^{-1} + z^{-1} \cdot a^{-2} + z^{-2} \cdot a^{-3} + \ldots z^{-i} \cdot a^{-(i+1)})$$

This sequence is convergent if the modulus of a is smaller than 1. It can therefore be applied to the first groups of roots of C(z). Polynomials are then obtained that constitute an approximation, the precision of which increases with i.

For the roots with a modulus greater than 1, this sequence is divergent. To make it convergent, a change in variable is made:

$$y = 1/z^{-1} = z^{-1} = 1/y$$

$$1/(z^{-1} - a) = -y/a \cdot (1/y - a^{-1}).$$

The second term can then be split up into a convergent sequence, for the modulus of $a^{-1}$ is smaller than 1. In replacing y by its value z, the following approximation is obtained:

$$1/(z^{-1} - a) = z + az^2 + a^2z^3 + \ldots + a^i z^{i+1}$$

This method amounts to making a leftward division. The other polynomials corresponding to the roots with a modulus greater than 1 can then be determined.

The product of these N−1 polynomials, in restricting the number of terms to the desired length, will give the equation of the desired mismatched code. The greater the number of terms contained in this polynomial, which is an approximation, the better will be the results obtained.

The coefficients of the mismatched code are the result of several approximations, and the final result depends on the precision of the computations. Furthermore, the coefficients found should be encoded on a number of bits fixed by the chosen correlator.

The result of the intercorrelation of a code by a mismatched code gives low but not zero side lobes. To eliminate them, it is necessary to repeat the computations for each instant of the code, starting from the main peak: the N coefficients of the center, which correspond to the main peak, are kept. Then, after a shift, the value of the next coefficient is computed to obtain a zero correlation result, and this operation is continued during N shifts to obtain the N following coefficients. The N coefficients preceding the main peak may be deduced from the latter for they have the same modulus and the same sign as the corresponding coefficients of the mismatched code.

The code thus obtained is constituted by at least 3N coefficients.

An example of computation of the weighting of coefficients is given here below for the code of the example, namely 11101.

Let it be assumed that this code is taken to encode the pulse transmitted and, hence, to carry out the self-correlation according to the processing A.

The coefficients CD of the mismatched code encoded on 8 bits are as follows in decimal values.

| $C_0$ | $C_1$ | $C_2$ | $C_3$ | $C_4$ | $C_5$ | $C_6$ | $C_7$ |
|---|---|---|---|---|---|---|---|
| −3 | −11 | 29 | −31 | −5 | 74 | −127 | 79 |
| $C_8$ | $C_9$ | $C_{10}$ | $C_{11}$ | $C_{12}$ | $C_{13}$ | $C_{14}$ | |
| 127 | 74 | 5 | −31 | −29 | −11 | 3 | |

Coefficients CB, which give five zeros on either side of the main peak, are deduced from CD on the basis of the five central coefficients. Taking an input signal standardized at an amplitude equal to unity, the computation of the correlator for a shift corresponds to:

| coeff | $C_5$ | $C_6$ | $C_7$ | $C_8$ | $C_9$ | $C_{10}$ |
|---|---|---|---|---|---|---|
| | 74 | −127 | 79 | 127 | 74 | x |
| signal | 0 | 1 | −1 | 1 | 1 | 1 | the output signal of the correlator is:

$$S(1) = C_6 - C_7 + C_8 + C_9 + C_{10} = 0$$
$$C_{10} = -C_6 + C_7 - C_8 - C_9 = 127 + 79 - 127 - 74 = 5$$

It happens that, in this case, the coefficient corrected by this computation is equal to the code initially found for the mismatched code CD. This is not so in every case.

In carrying out the same computation for 2, 3, 4 and 5 shifts, the next coefficients are determined.

A part of a radar receiver working according to the invention is shown in FIG. 5.

This part has an analog/digital converter 1.

The output signal from the converter is then divided between two channels, a channel A and a channel B. Each of these two channels has a correlator 2a, 2b, if necessary a filter 3a, 3b and a detector unit 4a, 4b, these two channels meeting up again at an AND logic circuit represented in FIG. 5 by a gate 5.

The particular embodiment of the radar according to the invention relates to a Doppler radar with digital pulse compression and, in this case, each of the processing channels includes, in addition to a correlator and a filter, an FFT module 6a, 6b and a post-integration module 7a, 7b.

This embodiment is shown schematically in FIG. 6.

FIG. 7 shows the end of the processing channels A and B as shown in FIGS. 5 or 6. This figure shows a module 8 enabling the introduction of an additional criterion. In the example shown in FIG. 7, this module is a level comparator. The signals coming from each of the processing channels A and B are therefore introduced, firstly, into the AND gate 5 and, secondly, into the module 8. The signals at output of the AND gate 5 and of the module 8 are, in turn, introduced into an AND gate 9. Detection is declared only if the output signal from the gate 9 is positive.

These modules have been represented as physical units in FIG. 7, but it is clear that they can be integrated into logic modules in the form of functions.

As has already been pointed out further above, the signal processing method according to the invention may be extended to communications receivers by using, for example, the device of FIG. 5.

The exemplary embodiment has a mismatched code with a length 3N, but it is clear that this is the minimum length to obtain an intercorrelation function with the transmitted code comprising N zero side lobes on either side of the major lobe. It is therefore possible to take mismatched lobes with a length of over 3N.

The length is limited, however, chiefly by the components that actually exist in the market, especially the special-purpose processors used for shift registers and, secondarily, by the increase in processing time.

What is claimed is:

1. A method for the processing of a signal received directly or indirectly from a transmitter, sending out pulses that are digitally encoded according to a transmission code of N instants;

said processing comprising notably an operation of filtering that is matched with the transmitted signal and an operation of detection by the comparison of the post-filtering level of the signal with a so-called detection threshold;

wherein the signal received is subjected to two processing operations A and B, the processing operation A comprising a self-correlation and the processing operation B comprising an intercorrelation with a mismatched code having a length at least equal to 3N, the function of intercorrelation of this mismatched code with the transmission code giving a major central lobe and at least N side lobes that are zero on either side of this major lobe;

and wherein it is decided that there is a detection relating to one of the instants of the correlation or of the intercorrelation only if the levels of the functions of self-correlation and intercorrelation of this very same instant are higher than the detection threshold.

2. A method according to claim 1, wherein it is decided that there is a detection only after the signals coming from the processing operations A and B have been subjected to an additional criterion.

3. A method according to claim 2, wherein said step of subjecting said signals outputted from said A and B processing operations to an additional criterion comprises comparing the levels of said signals outputted from said A and B processing operations.

4. A signal receiver comprising:

A and B channels, said A channel comprising, in series, at least one autocorrelator and at least one threshold detector, said B channel comprising, in series, at least one intercorrelator and at least one threshold detector, and an AND circuit, for logically ANDing the output of said A and B channels.

5. A signal receiver comprising:

A and B channels, said A channel comprising, in series, at least one correlator and at least one detector, said B channel comprising, in series, at least one correlator and at least one detector, an AND circuit, for logically ANDing the output of said A and B channels, and an analog/digital converter which feeds a signal to the channels A and B.

6. A Doppler radar receiver according to claim 5, wherein each of the channels A and B further comprises an FFT module and a post-integration module.

7. A radar receiver comprising:

A and B channels, said A channel comprising, in series, at least one correlator and at least one detector, said B channel comprising, in series, at least one correlator and at least one detector, a first AND circuit, for logically ANDing the output of said A and B channels, a comparison module receiving the signals outputted from each of the processing channels A and B, and a second AND circuit receiving the output signals from said comparison module and said first AND circuit.

* * * * *